(12) United States Patent
Laib et al.

(10) Patent No.: US 6,367,651 B2
(45) Date of Patent: *Apr. 9, 2002

(54) VENTED CONTAINER FOR PRODUCE

(75) Inventors: Douglas M. Laib; Stephen C. Graner; Edward M. Poslinski; Joseph J. Duska; Laurent E. Fischer, all of Orlando; Morison S. Cousins, Winter Park, all of FL (US); Robert H. C. M. Daenen, Herne (BE)

(73) Assignee: Dart Industries Inc., Orlando, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,589

(22) Filed: Dec. 30, 1998

(51) Int. Cl.$^7$ .................................................. B65D 8/12
(52) U.S. Cl. ........................ 220/676; 206/550; 220/608; 220/DIG. 27
(58) Field of Search ................................. 220/676, 789, 220/791, 89.1, 913, 360, 840, 842, 661, 601, 203.09, 203.13, 366.1, 623, 600, 361, DIG. 10, DIG. 27; 215/300, 385; 206/550

(56) References Cited

U.S. PATENT DOCUMENTS

| | | | | |
|---|---|---|---|---|
| 43,287 A | * | 6/1864 | Burnham | .................... 220/623 |
| 874,138 A | | 12/1907 | Trett | |
| 1,142,932 A | * | 6/1915 | Clark | .......................... 206/550 |
| 1,398,261 A | * | 11/1921 | Geisler | ........................ 220/623 |
| 1,580,440 A | | 4/1926 | Palley | |
| 1,839,414 A | * | 1/1932 | Scherz et al. | ................ 206/550 |
| 2,361,958 A | | 11/1944 | Nyden | |
| 2,585,602 A | | 2/1952 | Turner | |
| 2,606,686 A | | 8/1952 | Barranco | |
| 3,181,720 A | * | 5/1965 | Cassie et al. | ........ 220/366.1 X |
| 3,362,566 A | | 1/1968 | Hanania | |
| 3,428,236 A | | 2/1969 | Bidwell | |
| 3,595,429 A | * | 7/1971 | Kohen | .................... 220/203.13 |
| 3,955,710 A | | 5/1976 | Commisso | |
| 4,135,331 A | | 1/1979 | Lamlee | |
| 4,251,482 A | * | 2/1981 | Sanderson et al. | ... 220/203.9 X |
| 4,339,036 A | | 7/1982 | Jensen | |
| 4,358,992 A | | 11/1982 | Behnisch | |
| 4,512,497 A | | 4/1985 | Grusin | |
| 4,576,309 A | * | 3/1986 | Tzifkansky et al. | ........ 220/360 |
| 4,597,503 A | | 7/1986 | Lates | |
| 4,676,371 A | | 6/1987 | Byrne | |
| 4,923,085 A | | 5/1990 | Lillelund et al. | |
| 5,022,527 A | | 6/1991 | Braeutigam | |
| 5,031,796 A | | 7/1991 | Schafer et al. | |
| 5,065,889 A | | 11/1991 | Conti | |
| 5,152,420 A | * | 10/1992 | Bird et al. | ................... 220/600 |

(List continued on next page.)

Primary Examiner—Stephen P. Garbe
Assistant Examiner—Joseph C. Merek
(74) Attorney, Agent, or Firm—Taylor J. Ross

(57) ABSTRACT

A vented container for produce having a base and a cover which are at least substantially impervious to gas transfer. The base includes a base panel and side walls. Preferably two vent apertures are formed through the side wall, and a plug is provided for each vent aperture, to permit the vent apertures to be selectively opened. The plugs may be mounted upon vent toggles, such that manual pivoting of the vent toggles will open or close the associated vent aperture. The selective opening of the vent apertures permits gas exchange between the interior of the container and the ambient atmosphere, providing improve storage for produce. Maintaining the vent apertures closed permits the container to be used as a normal sealed food storage container. The base panel preferably includes an alternating series of hills and troughs to segregate condensate within the container. The troughs may be downward concave to further subdivide the condensate within each trough. The hills may include central depressions to act as traps to reduce condensate flow over the hills.

6 Claims, 4 Drawing Sheets

U.S. PATENT DOCUMENTS

| | | |
|---|---|---|
| 5,273,172 A | 12/1993 | Rossbach et al. |
| 5,337,910 A | 8/1994 | Picozza et al. |
| 5,366,107 A | 11/1994 | Rostkowski |
| 5,388,714 A | 2/1995 | Zutler |
| 5,388,717 A | 2/1995 | LeVasseur |
| 5,395,006 A | 3/1995 | Verma |
| 5,456,379 A * | 10/1995 | Krupa et al. ............ 220/676 X |
| 5,587,192 A * | 12/1996 | Beizermann ......... 220/366.1 X |
| 5,685,452 A | 11/1997 | Kristoffersson |
| 5,695,097 A | 12/1997 | Rollinghoff |
| 5,762,228 A * | 6/1998 | Morgan et al. .......... 220/367.1 |
| 5,866,184 A * | 2/1999 | Gorlich et al. ....... 220/DIG. 27 |
| 5,924,583 A * | 7/1999 | Srevens et al. ......... 215/380 X |
| D417,341 S | 12/1999 | Hampshire |

\* cited by examiner

VENTED CONTAINER FOR PRODUCE

CROSS-REFERENCE TO RELATED APPLICATIONS

This application is related to Ser. No. 29/098,469, pending (Atty. Dkt. No. 130423-D200), which is incorporated by reference herein and made a part hereof, including but not limited to those portions which specifically appear hereinafter.

STATEMENT REGARDING FEDERALLY SPONSORED RESEARCH

Not applicable.

BACKGROUND OF THE INVENTION

The present invention relates in general to household storage containers for produce. In particular, the present invention relates to a produce storage container having selective venting and an improved bottom panel structure.

In storing food in the household, the primary concern is maintaining freshness of the food. To maintain freshness, two main methods have been employed. The first is refrigeration, and the second is containment. These are typically, but not necessarily, used together for maximum effectiveness.

Refrigeration is, of course, the provision of a reduced temperature environment. This reduced temperature reduces the grown rate of bacteria and other organisms, slowing their degradation of the stored food. This is a well known arrangement.

Containment of food in an effort to maintain freshness has typically meant sealing the food against air exchange with the ambient environment, preferably at a reduced pressure. This has been achieved in numerous ways, such as by encasement within carefully folded aluminum foil, encasement within plastic bags which may be sealed, or placement within a plastic container having an air-tight seal. Such containers are typified in the assignee's product, sold under the registered trademark TUPPERWARE.

While this storage method is excellent for certain food types, it has been found that this is not the best storage method for produce. Specifically, fresh produce continues to live for some time after harvest, including during the period the produce is typically consumed. This means that the produce continues to respirate and produce other gasses. Further, the trauma induced by harvest can often result in the respiration rate of the produce to increase, sometimes dramatically, over the respiration rate in the field. Relatively prolonged exposure to an excessive concentration of these respiration and other gasses may degrade the appearance, flavor, texture, or other aspects of the produce.

Sealing produce against air exchange, as described above, may be seen to simply trap the respiration and other gasses with the produce. Unless the seal is periodically broken to permit air exchange, buildup of an excessive concentration will occur, degrading the produce. To prevent this, several containers for produce have provided for gas exchange.

A first example is shown in U.S. Pat. No. 4,676,371 to Byrne. Byrne describes a produce storage container formed of an air-impervious material, but having several gas exchange openings. The openings are formed in a base of the container, and a lid is provided to close the top of this base. A second example is a product sold by TEFAL S. A. under the model name "la lègumière". This product includes a base formed of an air impervious material, and having a lid. The lid is also formed of an air impervious material, but includes a pair of apertures extending therethrough and a sliding gate which may be manually moved to selectively block one of these apertures. The aperture may not be closed in a gas-tight manner, but does include a filter to prevent ingress of contaminants. Both of these containers may be used within a household refrigerator to increase the freshness of the produce through refrigeration.

SUMMARY OF THE INVENTION

An object of the present invention is to provide a container which will store produce with the maximum freshness for the maximum amount of time, by permitting gas exchange with the ambient environment.

Another object of the present invention is to provide such a container which may also be used in the convention manner with essentially no gas exchange.

A further object of the present invention is to provide a container which permits the amount of gas exchange to be varied between different levels for accommodating foods require no gas exchange, foods which required moderate gas exchange, and foods which require high gas exchange.

Yet another object of the present invention is to provide such a container which is well suited for use in a household refrigerator.

Another object of the present invention is to provide such a container which includes a base structure which reduces contact of the stored food with any condensate which may have accumulated within the container.

A further object of the present invention is to provide such a base structure which further serves to segregate such condensate into discrete areas to reduce cross-contamination between such areas, and to reduce shifts in the center of mass of the container.

These and other objects are achieved by a vented container for produce having a base and a cover which are at least substantially impervious to gas transfer. The base includes a base panel and side walls. Preferably two vent apertures are formed through the side wall, and a plug is provided for each vent aperture, to permit the vent apertures to be selectively opened. The plugs may be mounted upon vent toggles, such that manual pivoting of the vent toggles will open or close the associated vent aperture. The selective opening of the vent apertures permits gas exchange between the interior of the container and the ambient atmosphere, providing improve storage for produce. Maintaining the vent apertures closed permits the container to be used as a normal sealed food storage container. The base panel preferably includes an alternating series of hills and troughs to segregate condensate within the container. The troughs may be downward concave to further subdivide the condensate within each trough. The hills may include central depressions to act as traps to reduce condensate flow over the hills.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
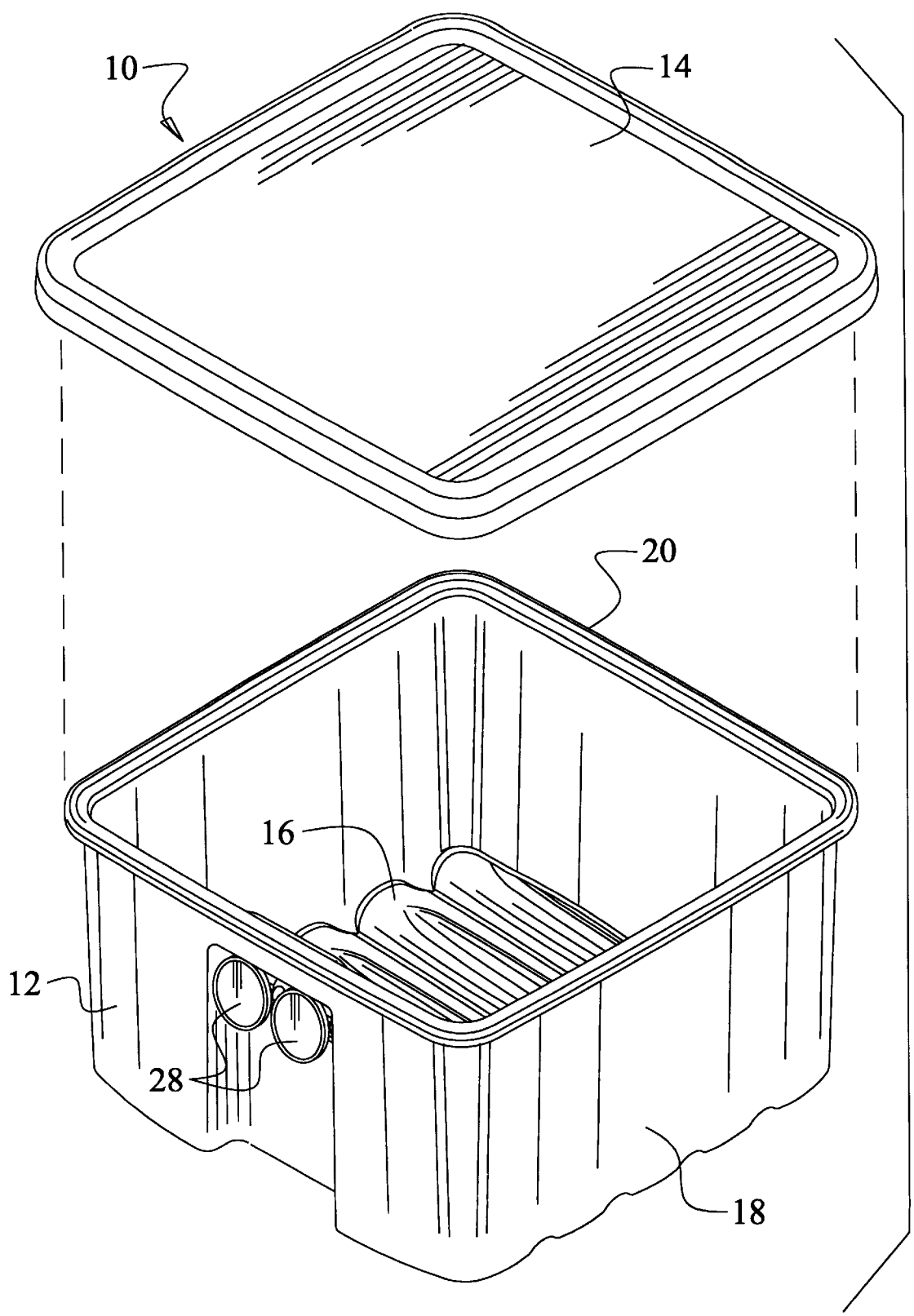
FIG. 1 is an exploded perspective view of a container according to the present invention.

With reference to FIG. 1, a container according to the present invention is generally designated by reference numeral 10. The container 10 includes a base 12 and a cover 14. The base 12 includes a base panel 16 having an outer periphery, and one or more side walls 18 extending upward from this periphery to a rim 20. The size and shape of the periphery of base 12 may vary widely. However, for the intended use within a household refrigerator it is preferred that the periphery have a substantially square (as shown) or rectangular shape, as such may more efficiently utilize the space within a standard refrigerator. The rim 20 will preferably have a shape corresponding to that of the base panel 16, although this is not required. The base 12 is formed of any material safe for food, and which is substantially rigid. Examples include stainless steel, glass, ceramics, and, most preferred, food grade plastics.

Figure 3:
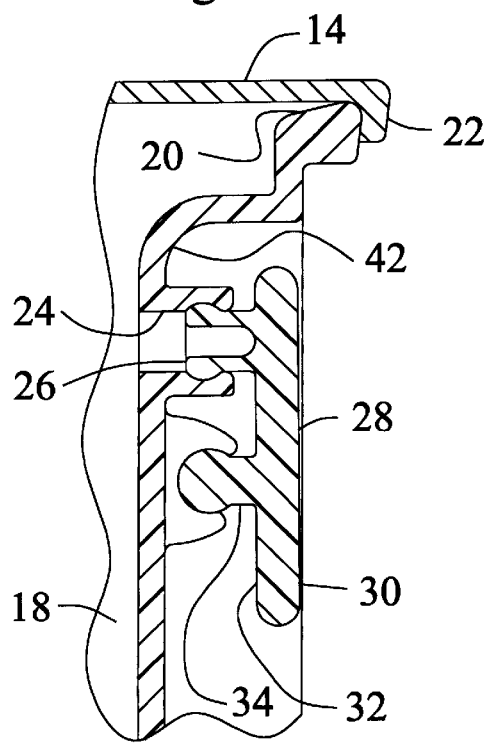
FIG. 3 is a cross-sectional view along line 3—3 of FIG. 2, with the selective vent in a closed position.

The cover 14 includes an outer periphery corresponding to that of the rim 20, such that the cover 14 may form a seal with the rim 20. This may be achieved in a variety of ways. For example, the cover 14 may include a depending portion (not shown) inset from its periphery which fits within, and seal s against, the inner face of the side walls 18 just below the rim 20. Alternatively, the rim 20 could include an upstanding rib (not shown) which mates with a corresponding groove (not shown) in the cover 14. As another example, the cover 14 may include a depending skirt 22 extending from its periphery (best shown in FIG. 3), and which fits closely about the outer face of rim 20 when in an assembled position. To provide an actual seal, the cover 14 is formed of, or includes portions formed of, a sufficiently resilient material to form a seal with the rim 20. If not formed entirely of this resilient material, at least those peripheral portions which contact at or adjacent to the rim 20 are formed of the resilient material. Alternatively, the portions of the base 12 which contact the cover 14 may be formed of the resilient material.

In this manner, the base 12 and cover 14 may form a closed container 10 when assembled together. The particular type of seal provided between the base 12 and cover 14 may vary as is known in the art. This seal may be relatively poor to prevent only the passage of relatively large material, may be water-tight, or may be gas-tight. In the most preferred form, a gas-tight seal would be provided.

The above arrangement is well known in the art, from any variety of quality food storage containers. An inventive feature of the present invention, however, is in the provision for selective venting of the container through the base 12.

Specifically, the base 12 includes at least one, and preferably two, vent apertures 24 extending through the side wall 18. The vent apertures 24 are located between the base panel 16 and rim 20, but preferably in proximity to the rim 20, as shown. This will ensure that any liquid within the container 10 (and in particular accumulated condensate) will be at a level significantly below that of the vent apertures 24. This will prevent both blockage of the vent apertures 24 by the liquid, and leakage of the liquid through the vent apertures 24.

As is apparent, the vent apertures 24 will permit the flow of gas to and from the interior of container 10. As noted above, however, the inventive feature is in providing selective venting of the base 12. To this end there is provided a means for selectively blocking the vent apertures 24 at the user's discretion.

This means for selectively blocking the vent apertures 24 may take various forms. For example, gas impervious members (not shown) could be mounted to the interior or exterior face of base 12 for movement between first positions spaced from the vent apertures 24, and second positions covering the vent apertures 24. This movement may be effected by sliding the members in a linear or arcuate path. While this arrangement can cause substantial blockage of the vent apertures 24, it is very difficult to achieve a water or gas tight seal. While this may be acceptable, it is preferred to have such a seal.

To provide the desired water or gas-tight seal of the vent apertures 24, a plug 26 may be associated with each of the vent apertures 24. Each plug 26 will have a size slightly greater than that of its associated vent aperture 24, and formed of a slightly resilient material (such as plastic) such that a tight fit is achieved. To improve this fit, the plugs 26 may have enlarged ends which mate with grooves formed within the vent apertures 24, as shown.

Figure 4:
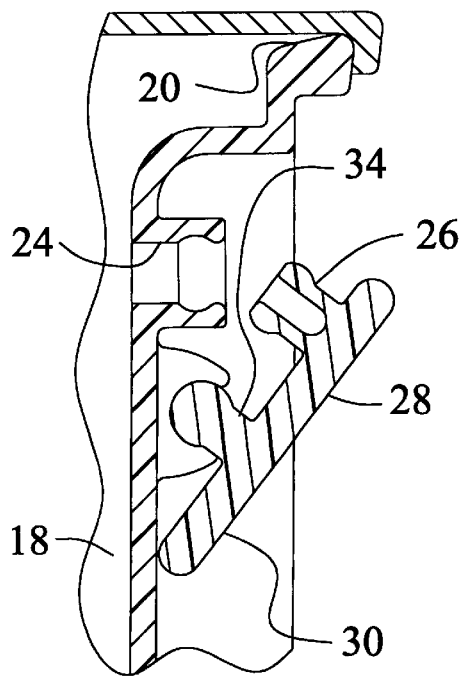
FIG. 4 is a cross-sectional view similar to FIG. 3, with the selective vent in the open position.

The plugs 26 may be unattached to the base 12. However, to prevent their loss, it is preferred that they be attached. This may be achieved in numerous ways, such as by securing an end of the plug to the side walls 18 by adhesive, ultrasonic or heat welding, etc. In the preferred embodiment shown, however, the plugs 26 are mounted to the base 12 for oscillation between a sealing position (shown in FIG. 3) and a venting position (shown in FIG. 4).

Figure 2:
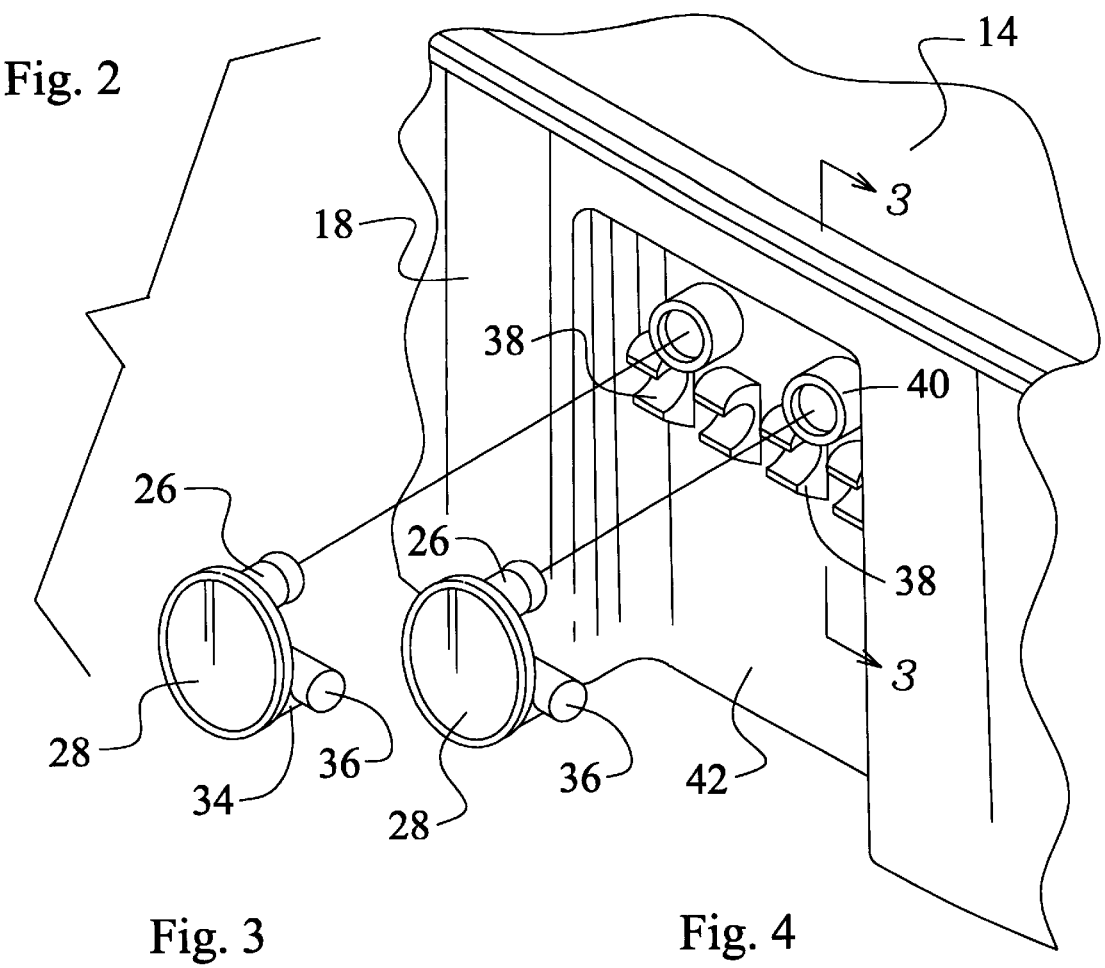
FIG. 2 is a detail exploded perspective view of the selective vent structure of the container of FIG. 1.

This is achieved by forming each plug 26 as an extension of a vent toggle 28. Each vent toggle 28 includes an outer face 30 and an inner face 32, with the plug 26 extending from the inner face 32. Each plug 26 also includes a spacer block 34 extending from the inner face 32 at a position spaced from the plug 26. The free end of each spacer block 34 includes a pair of hinge pins 36 (FIG. 2) extending laterally therefrom. Each of the hinge pins 36 are retained within an associated trunnion 38 mounted (preferably as a monolithic extension of) the base 12. Each trunnion 38 has a semi-cylindrical cavity which receives the associate hinge pin 36 for rotation, but prevents unintentional removal of the hinge pin 36 from the trunnion 38. As may be seen, the rotation of the hinge pins 36 in the trunnion 38 will cause the entire vent toggle 28 to rotate, which in turn will cause movement of the associated plug 26 toward and away from the associated vent aperture 24. The plug 26 will thus oscillate between the sealing and venting positions, as desired.

To improve the insertion of the plug 26 into the vent aperture 24, it may be desirable to form the vent apertures 24 with aperture extensions 40 extending outward from the side wall 18 toward the plug 26. Additionally, to prevent the vent toggle 28 from extending outward from the side walls 18, and thus risking unintentional movement of the vent toggle 28, the side wall 18 surrounding the vent toggle 28 may include a depression 42, as shown. This depression 42 will preferably be of a depth to space the outer face 30 of the vent toggle 28 just within the plane of the side wall 18 when the vent toggle 28 is in the sealing position of FIG. 3.

To operate the vent toggles 28, the user may manually press upon the outer face 30 in the vicinity of the plug 26 to force the plug into the vent aperture 24, thus placing the plug 26 in the sealing position and preventing water and/or gas transfer through the vent aperture 24. To move the vent toggle 28 to the venting position, the user may manually apply pressure to the inner face 32 (i.e., pull) adjacent the plug 26 to remove the plug 26 from the vent aperture 24. Alternatively, the vent toggle 28 may extend below the level of the spacer block 34, as shown. If this is the case, the user may manually press upon the outer face 30 below the spacer block 34 to achieve the same effect.

The above arrangement of an oscillating vent toggle is similar to that shown in U.S. Pat. No. 5,762,228 to Morgan et al. The main difference is in the placement of the vent aperture 24 in the base 12, rather than in the cover 14 as shown in that patent. This difference is important, however. Specifically, the Morgan patent maintains the vent closed during storage, and only opens the vent during microwave reheating. In the present container 10, the vent aperture 24 may be maintained open during storage to maintain a constant gas exchange rate. With this in mind, it is noted that space inside a refrigerator is often at a premium, and it is common to stack containers to more efficiently utilize the refrigerator space. Stacking another container upon the device of the Morgan patent would force the toggle closed, thus closing the vent and preventing gas exchange during storage. With the present location of the vent aperture 24 in the side wall 18, stacking of containers is not a problem. Further, in the present invention the use of depression 42 (together with any taper to the sidewalls 18, width of rim 20, and thickness of skirt 22) may prevent unintended closing of the vent toggle 28 by any adjacent containers. As such, the placement of the vent aperture 24 in the base 12 in the present invention is particularly suited to a container intended to be vented during storage, in contrast with prior art devices. It is noted, however, that the sealing properties of the plug 26 will permit the container 10 to be used in a manner similar to a sealed prior art device, permitting the container 10 to be used not only for storing produce (which should be vented), but also with other foods which should not be vented.

A further difference between the present invention and prior art devices is in the amount of gas transfer permitted. Specifically, the Morgan patent is concerned solely with venting of heated (and thus high pressure) gas to prevent pressure accumulation. The amount of gas released is not important, so long as it is above a certain threshold amount. In the present invention, the amount of gas transfer permitted is important.

Specifically, fresh produce continues to respire during storage. Further, different types of produce respire at different rates. As such, the amount of gas transfer is preferably variable. Based upon clinical studies, it is preferred that two vent apertures 24, each having a diameter of between about 2.0 and 5.0 mm, and most preferably approximately 3.5 mm, be employed. This will permit the user to 1) maintain both vent toggles 28 in the sealed position for produce requiring no gas transfer or for non-produce foods; 2) maintain a single vent toggle 28 in the venting position to permit a low amount of gas transfer for slowly respiring produce; or 3) maintain both vent toggles 28 in the venting position for quickly respiring produce. While a single large vent aperture 24 could be employed, this will provide more gas transfer than is required for some produce types. This may reduce the amount of respiration gas accumulation below optimal amounts for produce ripening, and additionally increases the amount of odor released from the container 10. Similarly, three or more smaller vent apertures 24 could alternatively be employed, but this increased control over the gas exchange rate increases the complexity of use. The preferred arrangement of two vent aperture 24 is believed to provide the best compromise between these competing factors.

While the above description is an improvement over the prior art for storing produce, another aspect of the present invention also enhances produce storage. This is a unique grid pattern formed in the base panel 16.

Figure 6:
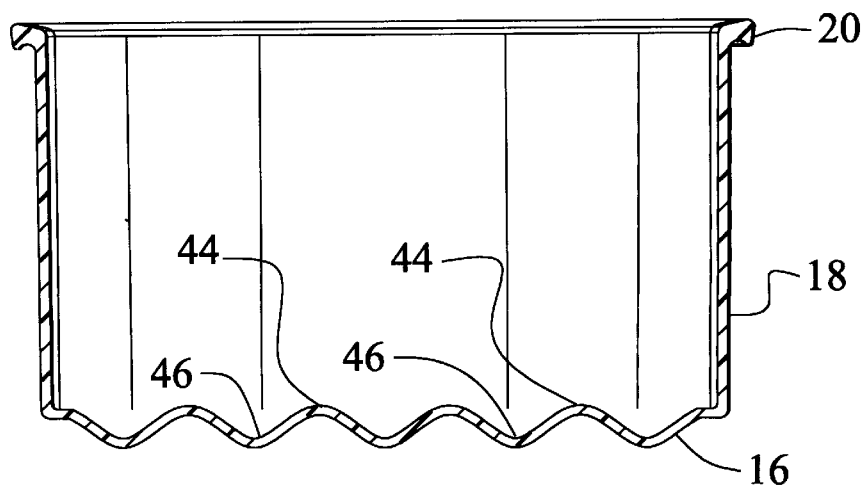
FIG. 6 is a cross-sectional side view along line 6—6 of FIG. 5.

Specifically, the base panel 16 is not planar, but includes a repetitive undulating surface formed by a series of hills 44 separated by troughs 46. Each of the hills 44 and troughs 46 extend parallel, and thus define lateral ends. This is best illustrated by FIG. 6. Such an arrangement will serve to channel any condensate within container 10 to the troughs 46, away from the produce resting upon the hills 44. This will also serve to segregate discrete pools of condensate. As such, if bacteria or other organisms begin to grow within one pool, the intervening hills 44 will serve as a barrier against their spread to other pools.

Figure 8:
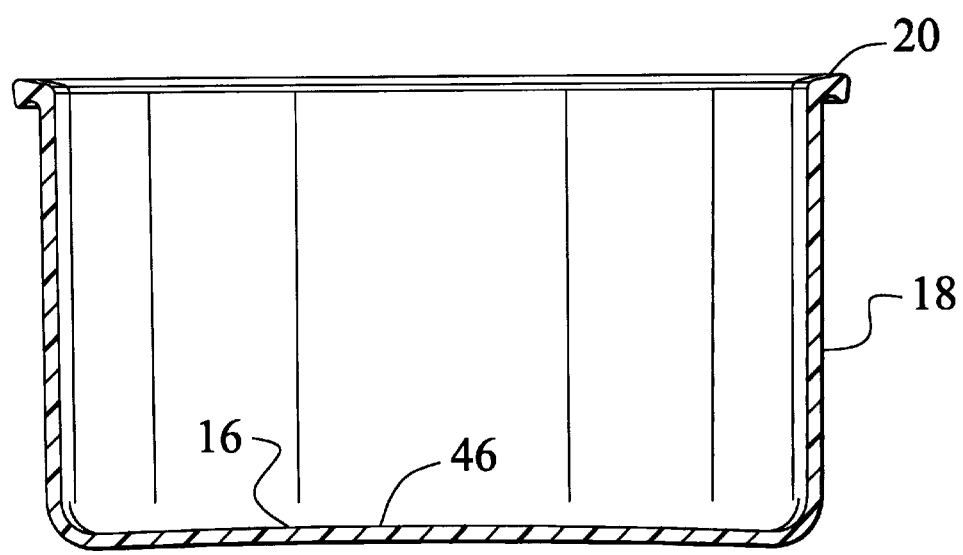
FIG. 8 is a cross-sectional end view along line 8—8 of FIG. 5.

Further, while these troughs 46 may be linear between the lateral ends, it is preferred that they have a concave downward curvature, illustrated best in FIG. 8. This will serve to further segregate the condensate trapped between adjacent hills 44 by forcing flow toward each of the lateral ends, thus subdividing the condensate between these adjacent hills 44. Further, the condensate adds weight to the container 10. This weight is not stable, however, as the center of mass of the combined container 10 and condensate shifts with the flow of the condensate within container 10. This shifting of weight may make the container 10 more difficult to lift and carry. The curvature within the troughs 46 acts as a barrier against flow of the condensate between the lateral ends, thus reducing the shifting of weight.

Figure 5:
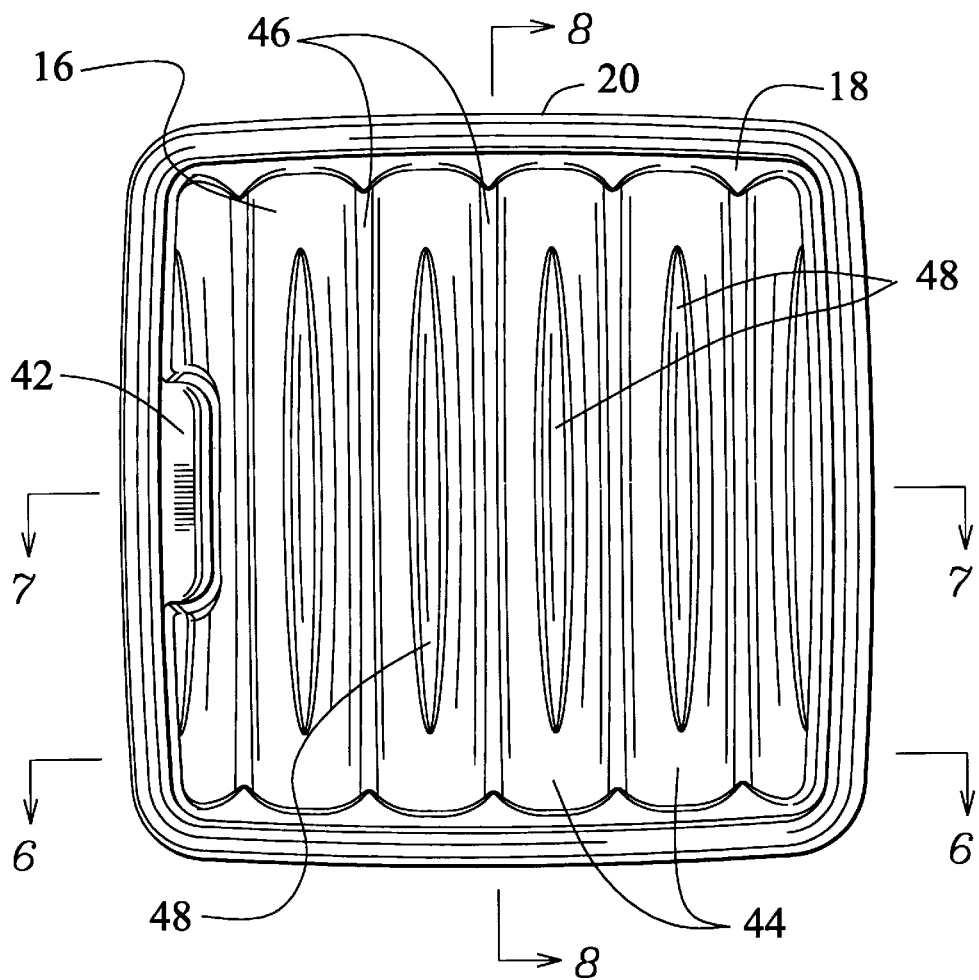
FIG. 5 is a top view of the base of the container of FIG. 1, illustrating the base panel structure.
Figure 7:
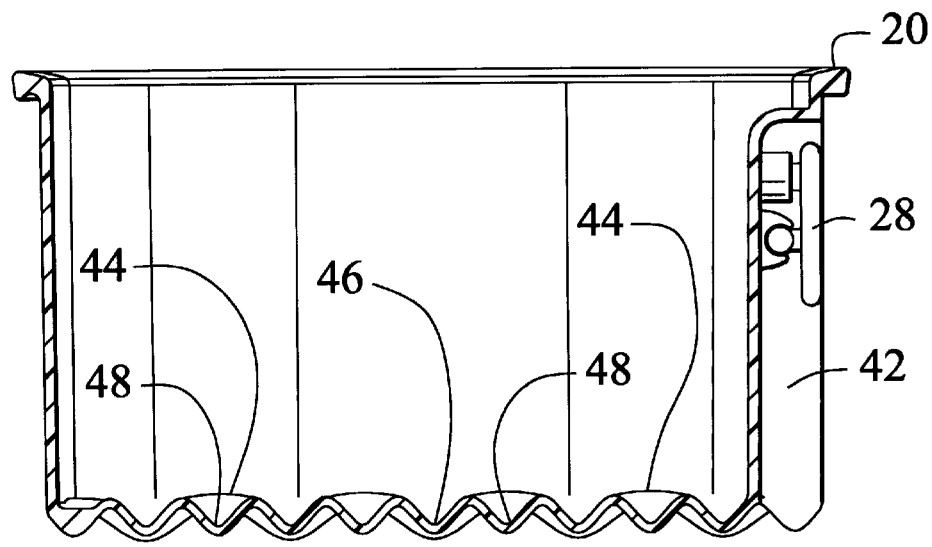
FIG. 7 is a cross-sectional side view along line 7—7 of FIG. 5.

Finally, each of the hills 44 preferably includes a central depression 48 at its apex and spaced inward from the lateral ends, best illustrated by comparison of FIGS. 5 and 7. This central depression 48 acts as a further barrier against flow of condensate between adjacent troughs 46. Specifically, any condensate which flows up a hill 44 will, upon reaching the apex, flow into the associated central depression 48 rather than simply flowing down the opposite side of that hill 44. As may be seen this will serve to trap condensate between adjacent troughs 46. While the central depression 48 could be extended to the lateral ends, this is not believed to be necessary if the troughs 46 include the downward concave curvature noted above. This curvature will create deeper portions of the troughs 46 adjacent the lateral ends, thus reducing the possibility of flow between adjacent troughs 46.

This points out the relationship between depth of the troughs 46 and likelihood of flow between troughs 46. As should be apparent, the deeper the troughs 46, the less likely this flow. However, increasing the depth of the troughs 46 not only requires more material to form base 12, but also reduces the available volume within container 10 to store the food. As such, the present arrangement for base panel 16 provides benefits in condensate segregation while providing increased storage space and using less material.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A vented container for produce, comprising:
   a base having a base panel with a periphery, and at least one side wall extending upward from said periphery to a rim;
   a cover constructed and arranged to mount upon said rim and close said base, defining an interior of said container;
   at least one vent aperture extending through said side wall at a position in proximity to said rim;
   a plug sized to be frictionally retained within said vent aperture, said plug extending from an inner face of a vent toggle, said vent toggle being pivotally mounted to said side wall for oscillating movement between a venting position in which said plug is spaced from said vent aperture, and a sealing position in which said plug seals said vent aperture; and
   said base panel including an alternating series of hills and troughs having lateral ends, said troughs being concave downward between said lateral ends, and a central depression extending into each of said hills, said central depressions being spaced from said lateral ends.

2. A container as in claim 1, wherein said vent toggle further includes a spacer block extending from said inner face, and a pair of hinge pins extend from a free end of said spacer block, and wherein said base includes a pair of spaced trunnions extending from said sidewall and pivotally mounting said hinge pins, said oscillating movement being effected by rotation of said hinge pins within said trunnions.

3. A container as in claim 2, wherein said sidewall further includes a depression therein surrounding and encompassing said vent toggle, said depression serving to space said vent toggle inward to protect said vent toggle against unintentional movement.

4. A container as in claim 3, wherein said at least one vent aperture comprises two of said vent apertures, and wherein each of said vent apertures has said means for blocking said vent apertures associated therewith for selectively sealing one or both of said vent apertures.

5. A container as in claim 4, wherein said vent apertures are circular, and have a diameter within the range of approximately 2.5 mm to 5 mm.

6. A container as in claim 5, wherein said vent apertures have a diameter of approximately 3.5 mm.

* * * * *